P. P. SAURUSAITIS.
ALTAR BREAD SOFTENER.
APPLICATION FILED JUNE 25, 1917.
1,266,721. Patented May 21, 1918.
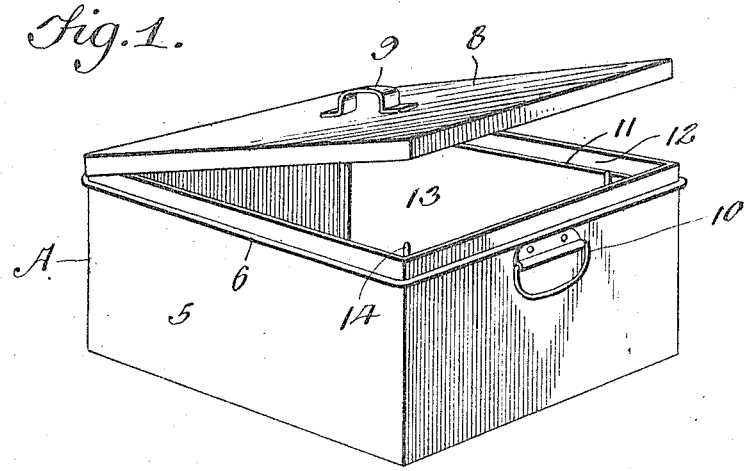
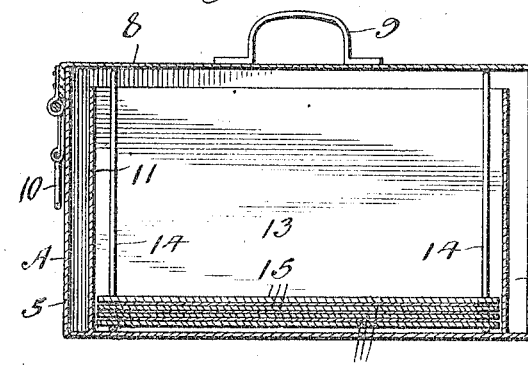
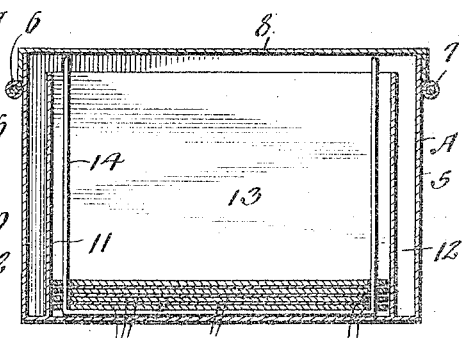
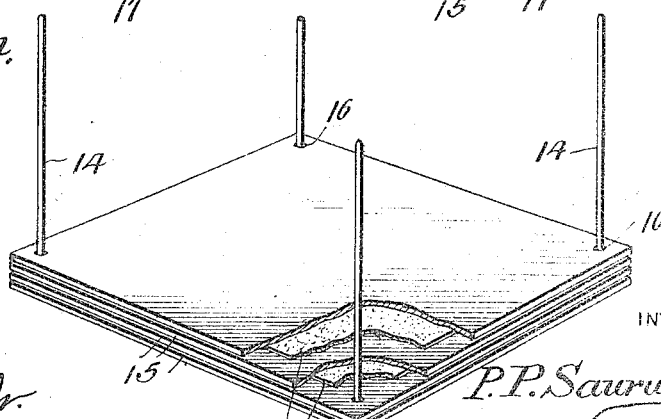
WITNESSES
INVENTOR
P. P. Saurusaitis,
BY Frank O. Parker
ATTORNEY

UNITED STATES PATENT OFFICE.

PETER P. SAURUSAITIS, OF WATERBURY, CONNECTICUT.

ALTAR-BREAD SOFTENER.

1,266,721. Specification of Letters Patent. Patented May 21, 1918.

Application filed June 25, 1917. Serial No. 176,798.

*To all whom it may concern:*

Be it known that I, PETER P. SAURUSAITIS, a citizen of the United States of America, residing at Waterbury, in the county of New Haven and State of Connecticut, have invented a new and useful Altar-Bread Softener, of which the following is a specification.

The invention relates to a bread softener, and more especially to the class of altar bread softeners.

The primary object of the invention is the provision of a device of this character, wherein altar bread used by clergymen and assistants in certain religious denominations can be conveniently placed and rendered sufficiently soft, so that such bread may be easily cut into wafers without the crumbling thereof, thereby enabling the wafers to remain intact for the serving of the same.

Another object of the invention is the provision of a device of this character, wherein the holder for the altar bread is novel in form to enable the bread to be placed therein with despatch, and the convenient removal thereof when the occasion requires.

A further object of the invention is the provision of a device of this character, which will embrace the desired features of simplicity, efficiency and durability, which will operate efficiently and effectively for its intended purpose, and which will be compact, to render it inexpensive in the manufacture thereof.

Other objects will be in part obvious and in part hereinafter pointed out.

The invention consists in the features of construction, combination and arrangement of elements, which will be exemplified in the construction hereinafter set forth, and the scope of the application of which will be indicated in the appended claims.

In the accompanying drawings:

Figure 1, is a perspective view of the device constructed in accordance with the invention, the cover or lid being partly open.

Fig. 2, is a vertical longitudinal section elevation.

Fig. 3, is a vertical transverse sectional view.

Fig. 4, is a perspective view of the rack, showing certain of the tray sections partly broken away.

Similar reference characters indicate corresponding parts throughout the several views in the drawing.

Referring to the drawing in detail, A designates generally a casing, which in this instance is in the form of a box-like body 5, preferably made from metal, although it may be constructed from any other suitable material, having an open top, while spaced from the latter and on the exterior surface of said body is a bead 6, housing a reinforcing wire or rod 7, which extends entirely around the body, and has hinged thereto at the rear of the same a cover or lid 8, which is adapted to telescope or fit over the open top of the body when closed, so as to rest upon the bead 6, thereon, and in this manner tightly seal the body.

On the cover or lid 8, is fixed a suitable handle 9, to facilitate the opening and closing thereof, while mounted exteriorly on each end of the body 5, is a swinging loop handle 10, which permits the device to be carried in the hands from one point to another when desired.

Interiorly of the body 5, spaced from the walls thereof is an inner shell or body 11, the walls of which rise from the bottom of said body 5, and terminate spaced from the open top thereof at their upper edges, to provide a water chamber 12, between the body 5 and inner shell or body 11, throughout the sides and ends, while within the latter is formed a compartment 13, for receiving a removable bread holder or rack hereinafter fully described.

The bread holder or rack comprises a pair of U-shaped frames 14, each made from a single length of rigid wire, on which are placed a plurality of trays or sections 15, the same being formed with holes 16, near their corners for the reception of the vertical limbs of said frames 14, whereby said trays or sections can be stacked one over the other in superposed relation to each other, and may be separated on the sliding thereof upon the limbs of said frames, or brought close together, for accommodating therebetween the thin layers of bread 17, which are impressed with lines of demarcation or otherwise stamped indicative of wafers, so that the bread when softened can be cut into wafer form for service, without the crumbling of the bread during the cutting thereof.

In practice, the bread is placed in the rack between the trays or sections 15, and thereafter said rack is placed within the compartment 13, in the casing A, it being understood of course that water is introduced into the chamber 12, and when the cover or lid 8, is closed the moisture from said chamber 12, circulates over the upper edges of the walls of the inner shell or body 11, into the compartment 13, and contacts with the bread on the trays or sections 15, thereby softening the bread, so that the same may be cut into wafers without producing crumbs.

It will be apparent that there is provided a device whereby altar bread may be softened preparatory to cutting the same into wafers, and in actual practice, it is only necessary to keep the bread within the casing for a short period of time before cutting.

While there is shown and described herein one preferred form of the invention by way of illustration, it is to be understood that the invention is not limited or confined to the precise details of construction herein described and delineated, as modifications and variations may be resorted to, such as come within the scope of the claims, without departing from the spirit of the invention or sacrificing any of its advantages.

What is claimed is:

1. A device of the character described, comprising a casing having a center compartment and a water chamber about the same, U-shaped frames, a plurality of trays slidably supported on the frames for removable mounting within the compartment, and a cover for the casing.

2. The combination with a casing having a compartment and water chamber, of a rack for detachable mounting within the compartment, comprising a pair of frames, each having vertically disposed limbs, and a plurality of plate like sections loosely engaged at their corners with the limbs of the frames.

In testimony, that I claim the foregoing as my own, I have hereto affixed my signature in the presence of two witnesses.

PETER P. SAURUSAITIS.

Witnesses:
 FRANCES M. GRAZIOSA,
 JOHN L. GAFFNEY.

Copies of this patent may be obtained for five cents each, by addressing the "Commissioner of Patents, Washington, D. C."